Sept. 20, 1927.  
R. P. MITCHELL  
1,642,786  
ELECTRICALLY HEATED WINDSHIELD WIPER  
Filed Feb. 2, 1927
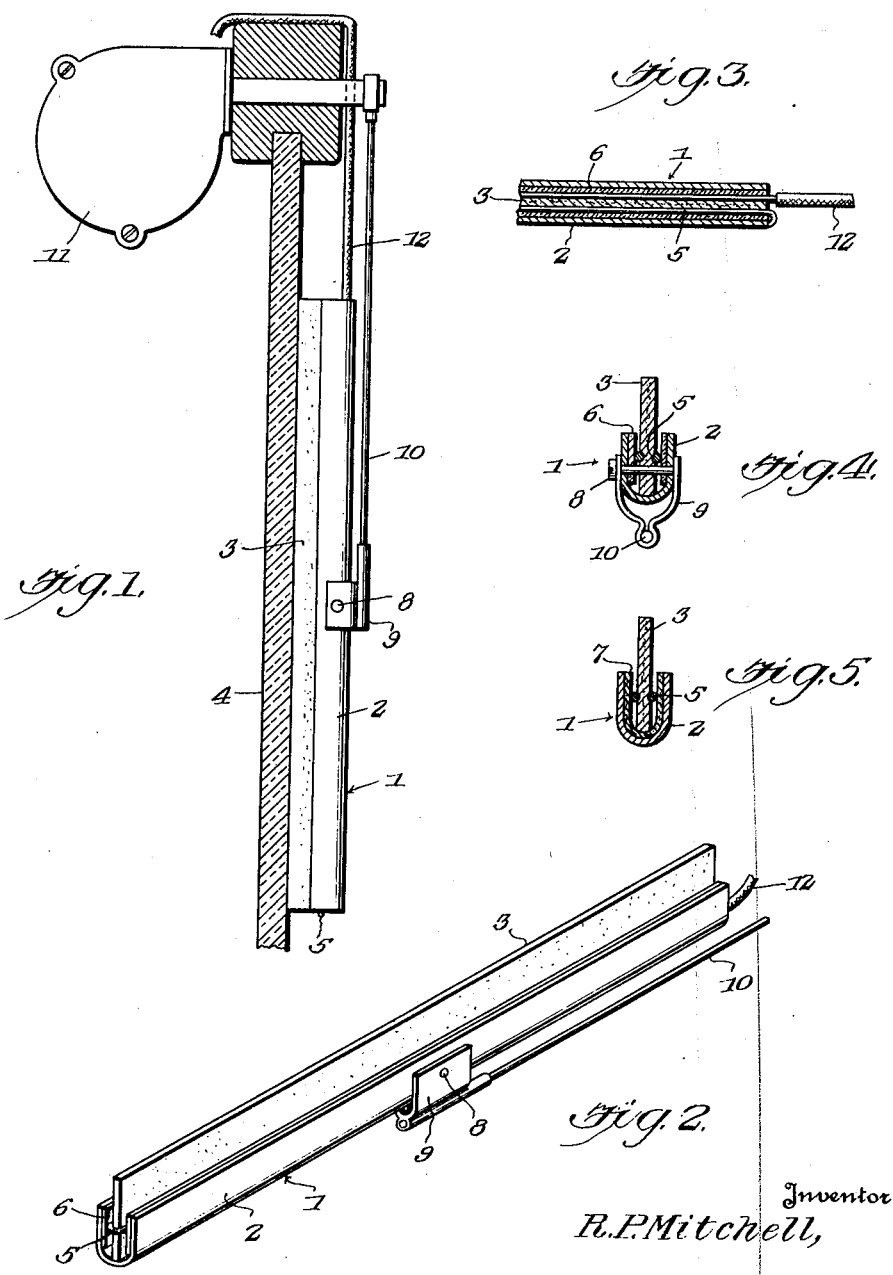
Inventor  
R. P. Mitchell,  
By Harry F. Riley  
Attorney Patented Sept. 20, 1927.

UNITED STATES PATENT OFFICE.

RAYMOND P. MITCHELL, OF DANVILLE, VIRGINIA.

ELECTRICALLY-HEATED WINDSHIELD WIPER.

Application filed February 2, 1927. Serial No. 165,314.

The invention relates to an electrically heated windshield wiper.

The object of the present invention is to improve the construction of electrically heated windshield wipers and to provide a simple, practical and compact electrically heated windshield wiper of strong, durable and comparatively inexpensive construction equipped with a heated wiping element of insulated non-combustible and non-vulcanizable material to which heat may be directly applied thereby obviating the necessity and inconvenience of installing a heating element in a windshield wiper having a wiping element of rubber or similar material.

A further object of the invention is to provide an electrically heated wiper of this character adapted to be applied to any of the ordinary windshield wipers on the market without necessitating any alteration in the construction of the operating mechanism for actuating the windshield wiper.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1 is a vertical sectional view of a portion of a windshield provided with an electrically heated windshield wiper constructed in accordance with this invention.

Fig. 2 is a perspective view of a portion of the device showing the oscillating arm and the wiper member.

Fig. 3 is a longitudinal sectional view of the wiper member.

Fig. 4 is a transverse sectional view of the same.

Fig. 5 is a similar view showing any form of insulation.

In the accompanying drawing in which is illustrated the preferred embodiment of the invention 1 designates a wiper or wiper member of a windshield wiper adapted to be applied to any of the ordinary windshield wipers on the market and comprising a holder 2 constructed of sheet metal or other suitable material and substantially U-shaped in cross section as clearly illustrated in Fig. 4 of the drawing. The holder 2 is of the ordinary construction and receives a combined heating and wiping element 3 consisting of a strip of asbestos composition which beside possessing insulating qualities is non-combustible and non-vulcanizable. The wiper strip 3 not only forms an efficient wiping element for cleaning a windshield 4 but it is also adapted to be electrically heated for applying heat to the surface to be cleaned to melt snow, ice, sleet and the like so that the windshield wiper will not be obstructed by such accumulation on the windshield and the windshield wiper will be efficient in cold, wet, snowy or sleety weather. The asbestos strip which may be of any preferred composition may be purchased in the market and is a well known material and, therefore, it requires no specific description.

A heating element 5 consisting of a resistance wire is arranged at opposite sides of the asbestos strip and is partially embodied therein as clearly shown in Fig. 4 of the drawing and is interposed between the asbestos strip and insulation 6 which may, as illustrated in the accompanying drawing, consist of sheets of mica arranged within the holder at opposite sides thereof and extending outwardly from the bottom of the holder to a point slightly beyond the side edges of the same. The mica sheets may be advantageously employed and have been found efficient in use, but any other suitable insulation may, of course, be employed and a single continuous U-shaped sheet of insulation may be used when the insulation is of such character to permit its use in such form as illustrated at 7 in Fig. 5 of the drawing. Such U-shaped outer insulation may be an asbestos strip bent into such form or any other suitable insulating material. When the outer asbestos strip is used the resistance wire of the heating element will then be arranged between the inner asbestos strip and the outer U-shaped asbestos strip. The resistance wire of the heating element extends longitudinally of the wiper member and is preferably grounded at one end and is connected at the other end with a suitable source of electric current carried by the automobile or other vehicle to which the device is applied.

The wiper member is secured by a screw or bolt 8 in an approximately U-shaped clip 9 of an oscillating windshield wiper arm 10 pivotally mounted on the windshield and connected with a suitable motor 11 of the ordinary construction. By removing the screw or bolt 8 of the clip 9 of the wiper arm 10 of a windshield wiper the improved electrically heated wiper arm may be readily substituted for the ordinary wiper arm and no change in the construction of any of the other parts of the windshield wiper will be necessary. A wire of the heating element is extended beyond the wiper arm and a suitable insulated portion 12 extends to the source of current supply and will permit any relative adjustment of the wiper element and the oscillating arm.

It will be clear that the asbestos strip which forms a combined heating and wiping element is adapted to be directly heated and that the heat is directly applied in this manner to the wiping element which contacts with and cleans the glass or other transparent portion of the windshield.

What is claimed is:

1. A wiper member for windshield cleaners and comprising a holder, a wiper element arranged in the holder and consisting of a strip of non-combustible material, insulation interposed between the non-combustible material and the holder, and a heating element arranged between the insulation and the said non-combustible strip for heating the latter.

2. A wiper member for windshield cleaners and comprising a holder, a wiper element arranged in the holder and consisting of a strip of non-combustible material, insulation interposed between the non-combustible material and the holder, and a resistance wire arranged at opposite sides of the non-combustible strip and extending along the wiper element and interposed between the said strip and the insulation.

3. A wiper member for windshield cleaners comprising a holder approximately U-shaped in cross section and a combined heated and wiper element consisting of a strip of asbestos material adapted to contact with and wipe the surface to be cleaned, a heating element associated with the asbestos strip for directly heating the latter, and insulation interposed between the heating element and the holder.

4. A wiper member for windshield cleaners comprising a holder approximately U-shaped in cross section and a combined heated and wiper element consisting of a strip of asbestos material adapted to contact with and wipe the surface to be cleaned, a resistance wire constituting a heating element and arranged at opposite sides of the asbestos strip for directly heating the same, and insulation interposed between the holder and the asbestos strip and protecting the heating element.

In testimony whereof I affix my signature.

RAYMOND P. MITCHELL.